United States Patent Office 3,637,860
Patented Jan. 25, 1972

3,637,860
PROCESS OF PREPARING GLYOXAL
William P. Keaveney, Pompton Plains, and James J. Pappas, Parsippany, N.J., assignors to Inmont Corporation, New York, N.Y.
No Drawing. Filed May 22, 1968, Ser. No. 731,308
Int. Cl. C07c 45/04
U.S. Cl. 260—604 R                11 Claims

ABSTRACT OF THE DISCLOSURE

A process of preparing glyoxal by reductive ozonolysis of benzene in a participating solvent.

---

This invention relates to a method of preparing glyoxal, more particularly it relates to the preparation of glyoxal by the reductive ozonolysis of benzene.

In the last 30 years, glyoxal, the simplest member of the aliphatic dialdehydes, has evolved from a laboratory chemical to a large-scale commercial product. The industrial synthesis of glyoxal involves catalytic oxygenation of ethylene glycol, giving as the ultimate saleable product a concentrated aqueous glyoxal solution containing unreacted glycol, formaldehyde, formic acid and glycolic acid as the major impurities. Other methods of preparing glyoxal include oxidizing such organic compounds as acetylene, ethylene, acetaldehyde, ethylene oxide or ethanol with an oxidizing agent such as oxygen, nitric acid, selenium dioxide, etc. The reaction of benzene with ozonized oxygen has long been recognized as leading to the formation of glyoxal. Although several studies have been reported on the kinetics of the ozonolysis of benzene, there has been very little reported on the preparation of glyoxal by the ozonolysis of benzene. Where glyoxal has been reported from the ozonolysis of benzene the yields have been extremely low 10–15%.

One of the objects of the present invention is to provide a synthetic process for producing glyoxal by the reductive ozonolysis of benzene.

The present invention provides an ozonization-reduction process for producing glyoxal in yields of from 50–75% based on ozone absorption by first ozonizing benzene in a participating solvent at a temperature of from 20° C. to −40° C., followed by a reductive workup of the reaction mixture. The objects of this invention are attained by proper selection of solvent and temperature for the ozonolysis reaction.

The ozonization may be a batch or continuous process. It is commonly carried out by passing a stream of oxygen containing ozone through a solution of benzene in a participating solvent. The reaction is preferably carried out at low temperatures to obtain high yields. Temperatures below about 20° C. are suitable and those below about −5° to about −40° C. are preferred.

An important feature of the process is the nature of the ozonolysis solvent. Participating solvents were utilized for ease of workup and for safety reasons. Since benzene is known to ozonize at an extremely slow rate and only with difficulty, the solvents utilized must exhibit exceptional stability toward ozone to allow preferential reaction with the benzene. An additional requirement of the solvent is that it must stabilize the ozonized intermediate to allow reduction to glyoxal.

The solvents utilized are participating solvents which have no appreciable reaction with ozone relative to benzene under the ozonization conditions. The solvents which are applicable in the practice of this invention are low molecular weight carboxylic acids, e.g., alkanoic having from 1 to 5 carbons. These solvents may be utilized alone or in a mixture with low molecular weight nitroalkane solvents such as nitromethane, nitroethane, 1-nitropropane, 2-nitropropane, etc.

When an admixture of a carboxylic acid and a nitroalkane is utilized, from 2 to 7 parts by volume of nitroalkane is used per part by volume of acid. Conventional ozonolysis solvents such as alkyl alcohols, e.g. methanol, were unsuitable due to their relative sensitivity toward ozone.

After ozonizing benzene in a participating solvent, reduction is accomplished by addition to the reaction mixture of a reducing agent. The preferred reducing agents are organic sulfides and acidified iodide ions.

The sulfide reducing agents having the formula RSR' are selected from the groups consisting of alkyl, alkenyl, aryl, aralkyl and alkaryl. It is comtemplated that for most purposes, the sulfide will be those in which the alkyl and alkenyl groups, and the aliphatic portions of the aralkyl and alkaryl groups, will contain up to 20 carbon atoms and preferably contain 1 to 18 atoms; the aryl groups and the aryl portion of the aralkyl and alkaryl groups are preferably monocyclic aryls. The R and R' groups may be bridged to form a cyclic compound. This cyclic compound may also include a second sulphur atom. Illustrative compounds include methylethyl sulfide, diethyl sulfide, dioctadecyl sulfide, methylphenyl sulfide, diphenyl sulfide, tetrahydrothiophene and dithiane. The preferred reducing agents are diphenyl sulfide, methyl phenyl sulfide, and alkyl sulfides containing 1 to 18 carbon atoms such as dimethyl sulfide, diethyl sulfide, ethylpropyl sulfide. Acidified iodide ions have been found to produce comparable results when utilized as the reducing agent in the practice of this invention.

No attempt was made to isolate monomeric glyoxal due to the ease with which it solvates and polymerizes. The amount of glyoxal formed by the reductive-ozonolysis process of this invention was determined by assay through the formation of the bis(2,4-dinitrophenylhydrazone). The yield of glyoxal was based on the amount of ozone absorption on the assumption that three moles of glyoxal are produced per mole of benzene ozonized. The yield of glyoxal produced by the process of this invention was in the range of from 50–75% based on ozone absorption.

The invention is further illustrated in the following examples. The ozonization in each of the examples was carried out in a conventional laboratory ozonization apparatus consisting of a reactor equipped with a stirrer, appropriate gas inlets and exits, cooling means, etc. The apparatus used is described in "Organic Ozone Reactions and Techniques" Maggiolo, page 22, 1962 edition, Welsbach Corporation. The ozonization gas is oxygen from an ozone generator, carrying ozone which is formed in the generator by an electric discharge.

EXAMPLE 1

The charge consisted of 6.28 g. (80 mmoles) of benzene, 25 ml. of acetic acid, and 55 ml. of nitromethane. The inlet gas, containing 12.15 mg. ozone/min. obtained by charging pure dry oxygen to a Welsbach T–816 Ozonator set at 86 volts and 0.2 l./min., was introduced into this solution held at −5° C. for three hours. Of the 2186 mg. ozone added, 360 mg. passed through unreacted, so that 1826 mg. (83.5% efficiency) or 38 mmoles reacted. Immediately after the dissolved ozone had been flushed from the solution with nitrogen, 5 ml. of dimethyl sulfide (0.068 mole), almost a 100% excess, was added dropwise below 10° C. After the solution had warmed to room temperature, it was diluted to exactly 250 ml. with methanol and a 20 ml. aliquot removed and added to 450 ml. of saturated aqueous 2,4-dinitrophenylhydrazine hydrochloride. Heating, overnight digestion, filtration, methanol washing, and drying gave 0.91 g. of glyoxal bis-(2,4-dinitrophenyl hydrazone) melting point 312–313°.

This figure normalizes to 27.2 mmoles, equivalent to 71.6% yield of glyoxal based on ozone.

In Examples 2–9, Example 1 is repeated using the same ingredients, proportions, conditions and procedure except that the temperature and time of ozonolysis have been varied.

| Example | Temp., °C. | Ozonolysis time, hours | Percent completion | Percent of introduced ozone absorbed | Percent yield |
|---|---|---|---|---|---|
| 2 | 15 | 1 | 6.0 | 92.3 | 51.1 |
| 3 | 15 | 3 | 18.2 | 90.5 | 60.0 |
| 4 | 15 | 4.5 | 22.5 | 74.0 | 55.6 |
| 5 | −5 | 1.5 | 8.2 | 84.4 | 63.3 |
| 6 | −5 | 4.5 | 24.3 | 83.7 | 71.7 |
| 7 | −20 | 1.5 | 6.5 | 70.7 | 73.5 |
| 8 | −20 | 3 | 12.5 | 64.0 | 70.0 |
| 9 | −20 | 5 | 20.5 | 64.6 | 71.0 |

EXAMPLE 10

The charge consisted of 6.28 g. (80 mmoles) and 80 ml. of acetic acid. The inlet gas containing 13.3 mg. ozone/min. was introduced into the solution held at 15° C. for four hours. Of the 3192 mg. ozone added, 2350 mg. or 48.9 mmoles reacted. After the dissolved ozone has been flushed from the solution with nitrogen, the reaction mixture was divided in two equal parts A and B.

Part A was treated with 1.55 g. dimethyl sulfide until a negative peroxide test was obtained. After the solution had warmed to room temperature it was diluted to 100 ml. with water and a 20 ml. aliquot removed and added to 250 ml. of saturated aqueous 2,4-dinitrophenylhydrazine hydrochloride. Heating, digestion, filtration, washing and drying gave 1.180 g. of glyoxal bis(2,4-dinitrophenylhydrazone).

Part B was treated with a solution of 8.30 g. of potassium iodide in 9 ml. water by adding the reducing solution dropwise to the reaction mixture at ice bath temperature. After heating the solution for several minutes at 80° C., the solution was decolorized; the solution was diluted to 100 ml. with water and a 20 ml. aliquot was removed and added to 250 ml. of saturated aqueous 2,4-dinitrophenylhydrazine hydrochloride. Heating, digestion, filtration, washing and drying gave 1.150 g. of glyoxal bis(2,4-dinitrophenylhydrazone).

The combined yields normalize to 28.2 mmoles, equivalent to 57.6% yield of glyoxal based on ozone.

EXAMPLE 11

The charge consisted of 10.0 g. (128 mmoles) of benzene, 25 ml. propionic acid and 50 ml. of 2-nitropropane. The inlet gas containing 31 mg. ozone/min. was introduced into the solution held at a temperature of −30° C. for 1.5 hours. Of the 2790 mg. ozone added, 788 mg. or 16.4 mmoles reacted. The dissolved ozone was flushed from the solution with nitrogen, 2 ml. of dimethyl sulfide was added dropwise below 10° C. The reaction mixture was stirred until a negative peroxide test was obtained. The reaction mixture was then diluted to exactly 100 ml. with methanol and 20 ml. aliquot removed and added to 400 ml. of saturated aqueous 2,4-dinitrophenylhydrazine hydrochloride. Heating, overnight digestion, filtration, washing, and drying gave 0.8 g. of glyoxal bis(2,4-dinitrophenylhydrazone). This weight is equivalent to a yield of 58.3% glyoxal based on ozone absorbed.

EXAMPLE 12

The charge consisted of 3.14 g. (40 mmoles) of benzene in 75 ml. of propionic acid. The inlet gas containing 12.87 mg. ozone/min. was introduced into the solution at 20° C. for five hours. Of the 3860 mg. of ozone added, 43.3% of theory reacted. The reaction solution was flushed with nitrogen and then 5 ml. of dimethyl sulfide was added between 15–20° C. The reaction mixture was diluted to 100 ml. with water and a 10 ml. aliquot was added to 250 ml. of saturated aqueous acidic 2,4-dinitrophenylhydrazine. Heating, overnight digestion, filtration, washing and drying gave 1.06 g. of glyoxal bis(2,4-dinitrophenylhydrazone). This is equivalent to a total of 25.4 mmoles of glyoxal or 49% yield based on ozone absorbed.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. A process of ozonizing benzene comprising (A) passing a stream of oxygen containing ozone through a solution of benzene at a temperature of from 20 to −40° C. in a participating solvent selected from the group consisting of a low molecular weight alkanoic acid containing from 1 to 5 carbon atoms and an admixture of a low molecular weight alkanoic acid with a low molecular weight nitroalkane containing from 1 to 3 carbons; (B) and reducing the ozonolysis product to glyoxal with an organic sulfide having the formula RSR' wherein R and R' are selected from the group consisting of alkyl, aryl, aralkyl and alkaryl containing 1 to 20 carbon atoms.

2. The process of claim 1 wherein the alkanoic acid is acetic acid.

3. The process of claim 1 wherein the alkanoic acid is propionic acid.

4. The process of claim 1 wherein the nitroalkane is nitromethane.

5. The process of claim 1 wherein the nitroalkane is 2-nitropropane.

6. A process of preparing glyoxal comprising (A) ozonizing benzene at a temperature of from 20 to −40° C. in a participating solvent selected from the group consisting of a low molecular weight alkanoic acid containing from 1 to 5 carbon atoms and an admixture of a low molecular weight alkanoic acid with a low molecular weight nitroalkane containing from 1 to 3 carbons; (B) reducing the ozonolysis mixture with an organic sulfide having the formula RSR' wherein R and R' are selected from the group consisting of alkyls, aryls, aralkyls, and alkaryls containing 1 to 20 carbon atoms.

7. The process of claim 6 wherein the alkanoic acid is acetic acid.

8. The process of claim 6 wherein the alkanoic acid is propionic acid.

9. The process of claim 6 wherein the nitroalkane is nitromethane.

10. The process of claim 6 wherein the nitroalkane is 2-nitropropane.

11. The process of claim 6 wherein the reducing agent is dimethyl sulfide.

References Cited

Sixma et al.: Rec. Trav. Chim., vol. 70, pp. 1005–1019.

Bailey, P. S.: Chemical Reviews, vol. 58, pp. 977–979, 986–992, 1958.

Bohme et al.: Chem. Ber., vol. 75, pp. 1310–1311, 1942.

Bernatek et al.: Acta Chem. Scan., vol. 21, pp. 1229–1233, 1967.

Long, L.: Chem. Reviews, vol. 27, pp. 452–454, 459–460, 1940.

LEON ZITVER, Primary Examiner

R. H. LILES, Assistant Examiner

U.S. Cl. X.R.

260—339